(No Model.)
C. L. COFFIN.
METHOD OF ELECTRICALLY WELDING METALS.
No. 499,518. Patented June 13, 1893.
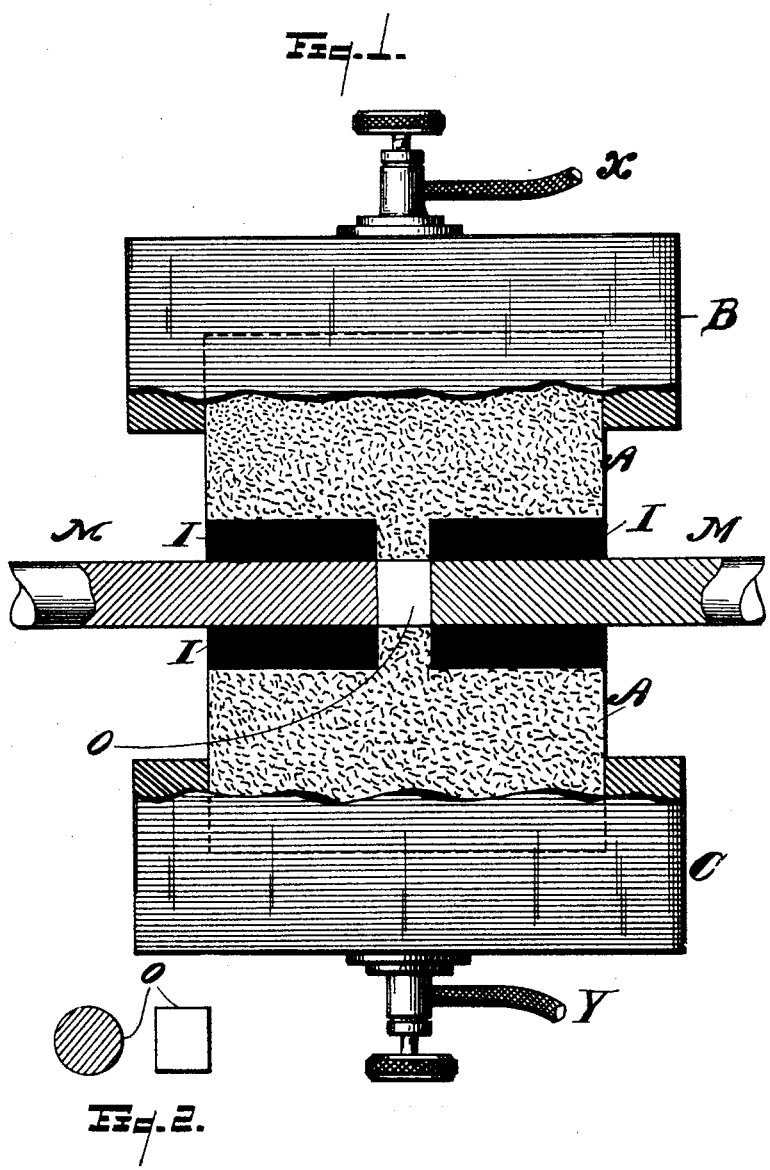
WITNESSES
Gertrude H. Anderson
Geo. H. Lothrop
INVENTOR
Charles L. Coffin

UNITED STATES PATENT OFFICE.

CHARLES L. COFFIN, OF DETROIT, MICHIGAN.

METHOD OF ELECTRICALLY WELDING METALS.

SPECIFICATION forming part of Letters Patent No. 499,518, dated June 13, 1893.

Application filed September 25, 1890. Serial No. 366,113. (No specimens.)

*To all whom it may concern:*

Be it known that I, CHARLES L. COFFIN, of Detroit, in the county of Wayne and State of Michigan, have invented a new and useful Improvement in Methods of Electrically Welding Metals, of which the following is a specification.

My invention consists in a new and useful method of electrically welding metals, hereinafter fully described and claimed.

Figure 1 is a diagram showing the working of my improved method; and Fig. 2 is an end view of short sections of material hereinafter referred to.

My invention is particularly adapted for welding together bars or pipes, in which the conductors A A' are carbons with terminals B C, and conductors $x$ and $y$, connected with the terminals of a generator of electricity, the space between said conductors A, A', except at one point, being filled with hollow insulating material I, and at this point the carbons A A' may be approached sufficiently close to each other to make contact with a short piece or section O, Fig. 2, of the same material as the articles M M. The circuit is thus completed between the carbons A A' through the small section O, whereby when the edges of this section and the adjacent edges of the articles M M are brought to a proper heat for welding the two articles M M and the short section O may be welded together. By means of this arrangement, the section O being a short section of pipe, and the articles M M being similar pipes, lengths of pipe may be readily and strongly welded together.

Mica is a good material for the insulation I.

What I claim as my invention, and desire to secure by Letters Patent, is—

The process herein described of electric welding, which consists in electrically heating a short section of material, heating the extremities of the articles to be welded by pressing the ends of the same against the short heated section and then completing the weld.

CHARLES L. COFFIN.

Witnesses:
HENRY B. LOTHROP,
GERTRUDE H. ANDERSON.